Patented Nov. 20, 1945

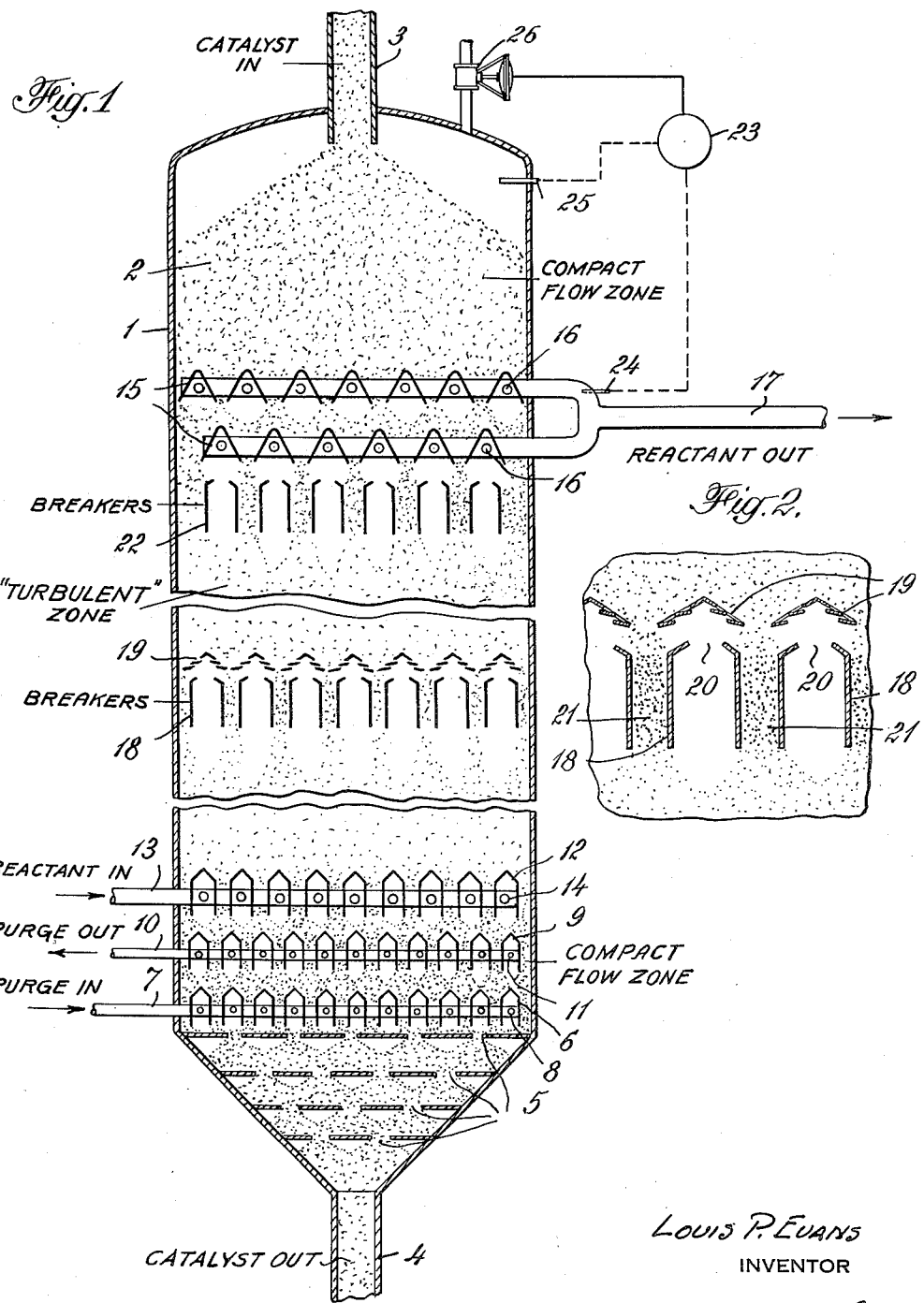

2,389,493

UNITED STATES PATENT OFFICE 2,389,493

METHOD AND APPARATUS FOR THE CONVERSION OF HYDROCARBONS

Louis P. Evans, Woodbury, N. J., assignor to Socony-Vacuum Oil Company, Incorporated, a corporation of New York Application October 8, 1943, Serial No. 505,424

6 Claims. (Cl. 196—52)

This invention has to do with the conversion of hydrocarbons in the presence of a particle-form solid contact mass material.

It is well known that hydrocarbons may be converted, for various purposes, in the presence of particle-form solid contact mass materials. The purpose of such conversion is usually cracking of a gas oil to gasoline but may be reforming, dehydrogenation, alkylation, oxidation, isomerization, or other process. The contact mass material is usually an adsorptive material of the general nature of clay, such as fuller's earth, filter clays, refined natural clays, acid treated clays, various synthetic associations of alumina and silica, such as co-precipitated gels, gels of alumina and/or silica, and similar materials, any of which may have added materials, such as various metallic oxides, for various catalytic purposes connected with the conversion contemplated.

The conversion of gas oil to gasoline, which is typical, is well known. A gas oil, boiling between say about 500° F. and 750° F. may be exposed at temperatures in the neighborhood of 850° F. to a particle-form solid contact mass material, resulting in the production of 30–40 volume per cent of gasoline, some permanent gas, and some carbonaceous material deposited upon the contact mass, the remainder being a gas oil very similar in nature to the starting material. The deposited coke destroys the activity of the contact mass, necessitating regeneration. Many operations utilize the contact mass as a fixed bed, regenerating in situ. More recent processes flow the contact mass as a stream through two zones in cycle, accomplishing conversion in one zone and regeneration in the other. This invention is specifically directed to this type of operation.

In the normal operation of this type, the contact mass material is flowed through the reaction and regeneration zones as a compact moving column, care being taken to hold the velocity of fluid reactant at levels below those which will disrupt the contact mass bed in order to assure uniform utilization of all portions of the contact mass. Consistent with this restriction is the necessity for careful and frequently elaborate precautions to insure uniform progression of the contact mass material through all portions of the reaction zone.

This invention has as a principal object the provision of a method of operation wherein the restriction hitherto imposed upon fluid reactant flow rates may be avoided and the unquestioned advantages available in many circumstances with higher flow rates may be obtained. As a secondary object, it presents a process wherein uniform contact mass utilization is assured without elaborate precautions in process conditions and apparatus design.

This invention has to do with the flowing of the reactants through a moving bed of contact mass material at rates sufficiently high to create a condition of partial aeration and turbulent flow of reactant and contact mass in the reaction zone without encountering certain difficulties found to exist when this operation is conducted in an uncontrolled manner. If utilization is made of a columnar reactor in which there is placed a column of contact mass material and to which reactant is fed at the bottom at rates sufficiently high to disrupt the bed without other precaution, several adverse phenomena occur and build up during the operation in a manner to eventually destroy many of the benefits which may be obtained by this operation. In the first place, in the simple apparatus just now described, the contact mass will be introduced into the reactor through a feed pipe to a point some distance below the top of the reactor in order to give above the contact mass a disengaging space from which reactant may be removed. When reactant is passed countercurrently at the high rates spoken of, it will be found that the contact mass column builds up in height to a distance above the point of contact mass inlet, which distance is variable, dependent upon the rate of reactant flow, and it will be found that the contact mass carried into this zone above the feed point will tend to remain at this level and will not be entrained and carried down and out of the reactor with the remainder of the contact mass. However, it is still exposed to reactants and will still collect coke and eventually we have in the reactor top a highly coked mass of catalyst. Another drawback is that in such operation particles of contact mass material of smaller sizes tend to move with the reactant and eventually accumulate in this zone in the top of the reactor from whence much of such fine catalyst soon commences to be carried out with reactants. A third phenomena noticeable as soon as major turbulent rates of flow are reached is that the reactant tends to pass up through the contact mass column in relatively large "bubbles." These bubbles may be many inches in vertical height and frequently extend from side to side of the reactor. In the lower portions of the reaction zone, they will travel upward through the agency of particles "raining" down from what might be spoken of as the "ceiling" of the bubble.

When this bubble reaches a certain depth from the top of the reactor, dependent upon flow rate and depth of catalyst above it, it will tend not to burst but to erupt violently upward through some limited portion of the reactor space. Frequently when such eruption occurs, a considerable amount of the catalyst normally remaining above the feed inlet will fall into and be entrapped in the downwardly travelling catalyst in the reaction zone. When this occurs, if the reaction has been under way long enough for the contact mass at the top of the reactor to be excessively coked, it will be seen that exceedingly uneven degrees of coke lay-down will be present in the effluent contact mass from the reactor leading to uneven burning.

It has been discovered that the benefits of higher rate reactant flow may be attained and many of these difficulties may be avoided by use of a method of operation and an apparatus which is adequately explained in the drawing attached to this specification.

Figure 1 of this drawing shows in diagram form a vertical section of such an apparatus, while Figure 2 is an enlarged view of a portion thereof. In the drawing, 1 is the shell of a vertical reactor within which there is maintained a down flowing column of particle-form solid contact mass material designated 2. This material is fed in through catalyst feed pipe 3 and is removed from the reactor through catalyst exit pipe 4. At the bottom of the reactor there may be installed a series of baffle plates 5 with appropriately arranged orifices to control the regular downward flow of contact mass relatively uniformly throughout all portions of the cross section of the reactor by withdrawing the contact mass in a plurality of relatively small streams from all portions thereof and re-combining these streams into a single exit stream. The rate of flow of contact mass through the column is controlled in known manner so as to maintain the reactor in a substantially filled condition as shown. Just above the bottom of the reactor there is a series of distributing troughs 6, manifolded to a supply pipe 7, which communicates to the space beneath the troughs by orifices 8 and spaced above this assembly is a similar assembly composed of troughs 9, pipe 10 and orifices 11. These two assemblies may be utilized for the purging of contact mass of reactant and prior to exit of the contact mass from the reactor, as, for example, by introducing an inert gas, such as steam, through pipe 7, distributing it through a contact mass column through the agency of troughs 6, re-collecting it by troughs 9 and removing it through pipe 10. Next in order is a similar though larger assembly consisting of troughs 12, manifolded to pipe 13 and in communication therewith through orifices 14. This assembly serves as an inlet for reactants, reactant being introduced through pipe 13, passing through orifices 14 into the spaces below troughs 12 and passing from thence into the contact mass. Somewhat below the top of the reactor, there is installed a reactant collecting outlet assembly, preferably composed of two or more levels of collector troughs 15 communicating by orifices 16 to a reactant outlet pipe 17. The vertical column of the reactor between inlet distributor troughs 12 and outlet collector troughs 15, is devoted to reaction and the rate of reactant flow therethrough is sufficient to keep the bed of contact mass material well aerated and in a condition wherein both the flow of reactants upwardly and the flow of contact mass material downwardly, is in a turbulent state. In order to avoid the bubble formation spoken of above, and in order to insure a proper contact of reactant and contact mass without the formation of bodies of reactant which receive relatively small contact with contact mass, there are placed at intervals in the reactor column an assembly of baffles which may be spoken of as breakers. Each breaker serves at its immediate level to effect a temporary separation of reactant from contact mass thus breaking up any tendency for bubble formation and like difficulties. In the drawing only a single breaker is shown. The breaker form shown consists of open topped troughs 18 surmounted by baffles 19. These devices will be better understood by reference to Figure 2, which is an enlarged view of a portion of the reactor at the breaker level. The trough 18 is seen to consist of a body having relatively deep vertical sides inbent at their tops but leaving a relatively large passage between the inbent sides at 20 and the baffle 19 is seen to be an inverted angle-shaped trough with slotted sides. The function of operation of a breaker is as follows:

The mixture just below the breaker is highly aerated contact mass. Breaker trough 18 provides an opportunity for the separation of reactant from contact mass and the relatively small passages between adjacent troughs 18 indicated by numeral 21 serve to gather the contact mass descending from above into a passage where it is compacted thus assisting in the separation of the reactant from contact mass at a level just below the breaker. Just above the breaker, reactant and contact mass are again mixed and the reaction again proceeds until encountering the next breaker; usually two or more of these breakers are installed, normally one level of breaker is installed for every four or five feet of vertical height of reactor column. In this manner the reactor column operation is not disturbed by the formation of reactant bubbles and any tendency towards spouting or geyser action is completely broken up before it can get started. At the reactant withdrawal level, a somewhat similar construction is utilized making use of breaker troughs 22 constructed the same as breaker troughs 18, except that in this case instead of the baffles 19, the next upward member of the assembly is the collector troughs 15 from which reactants are withdrawn from the column. To ensure smooth removal of effluent reactant, the total disengaging area provided under troughs 15 should be substantially in excess of the cross-sectional area of the contact mass column. Above the reactant withdrawal level the contact mass material is maintained as a solid column and the prevention of substantial movement of reactant to a point above the uppermost level of collector troughs 15 may be prevented by the utilization of an inert blanket gas handled as follows:

A differential pressure control instrument 23 observes the pressure in the reactant outlet at 24 and the pressure in the space above the contact mass at 25 and in response thereto controls valve 26 admitting sufficient amount of an inert gas, such as flue gas, for example, to provide a flow of such gas, relatively small in amount but sufficient to prevent entry of reactant into the upper level between the ultimate top of the reactor and the uppermost collector trough level.

This method of handling with its periodic recombination of contact mass material into a compact form, with its provision for a continuous feeding of contact mass material into the very top of the reaction zone, and its prevention of bubble formation and similar unwanted flow conditions serves also to prevent the segregation of fines material from the contact mass and serves to prevent the retention, even for a short time, of contact mass material in overly prolonged contact with reactants. At the same time it permits the use between reactant inlet and reactant outlet of reactant velocities very considerably higher than those which may be utilized in ordinary countercurrent flow.

On account of the many variations in density of reactant material, pressure, temperature, the catalyst density, catalyst particle size and other variables of the system, it is not possible to define accurately in numerical terms, what is meant by turbulent flow. It is, however, possible to define what is meant by turbulent flow in terms of some single exemplary material, say air, at atmospheric temperatures, in terms of various densities of contact mass and particle size so that proper computation may be made for the fluid reactant used at the conversion condition contemplated. In general, with air measured at 60° F. and atmospheric pressure and with a contact mass material of apparent density of 0.6 and an average particle diameter of 1.5 mm., turbulent conditions will be attained at flow rates of around 90–170 cubic feet per minute per square foot of cross-section of bed. With the same fluid, and same contact material in particles of 4.5 mm. average diameter, turbulent conditions will be attained with flow rates of 200–260 c. f. m. per square foot of bed. In other words, the velocities of fluid reactants should be under conversion conditions, as to correspond to air velocities, at atmospheric conditions, of from about 2 to 4 feet per second minimum, and 3 to 6 feet per second maximum, relative to total cross-sectional area of contact mass bed, for contact masses of an apparent density of 0.6, these velocities being related to particle sizes in the range of from about 1.5 mm. average diameter to about 4.5 mm. average diameter, the lower velocity of each bracket being appropriate for the smaller size of contact mass material.

It will be understood that in starting up an operation of this kind, the column will at first be completely filled with compact contact mass but that very shortly after commencing operations, the combined drainage of the contact mass from the bottom of the column and the buoyant effect of reactants holding back contact mass from entry will lead to establishment of desired operating conditions, after which the operation may be readily held in balance by control of rates of flow of reactant and of contact mass.

It will, of course, be understood that other forms of breaker construction may be used as, for example, a lattice work of several levels of inverted angle irons with appropriate orifices in the top of the angle of each level at the point where it passes under the angle next above. Other structures will, of course, suggest themselves to those skilled in the art.

The general principle of operation may be seen to be that of passing a particle form solid contact mass material downwardly through a reactor, introducing reactant thereinto at a point near but spaced away from the bottom and removing reactant therefrom at a point near but spaced away from the top of the contact mass column, the reactant being passed through the portion occupied by it at rates sufficient to give turbulent flow conditions between reactor inlet and reactor outlet while the portions of the contact mass column below reactant inlet and above reactant outlet are maintained in a substantially compact condition and while the flow of reactant and contact mass material through the reaction section of the column are both broken up at appropriate levels intermediate the ends of that reaction column.

I claim:

1. That method for the conversion of hydrocarbons in the presence of a particle form solid contact mass material which comprises flowing the contact mass downwardly under the influence of gravity through a confined passage, introducing contact mass to the top of said passage and removing it from the bottom thereof at a rate such as to maintain the passage substantially filled with a column of contact mass, introducing fluid reactant at conversion conditions of temperature and pressure to said column at a point adjacent but spaced above the bottom thereof, removing reactant from said column at a point near but spaced below the column top, flowing the reactant at such rate as to maintain turbulence of contact mass flow between reactant inlet and outlet, and maintaining a substantially compact contact mass column above said outlet and below said inlet.

2. That method for the conversion of hydrocarbons in the presence of a particle form solid contact mass material which comprises flowing the contact mass downwardly under the influence of gravity through a confined passage, introducing contact mass to the top of said passage and removing it from the bottom thereof at a rate such as to maintain the passage substantially filled with a column of contact mass, introducing fluid reactant at conversion conditions of temperature and pressure to said column at a point adjacent but spaced above the bottom thereof, removing reactant from said column at a point near but spaced below the column top, flowing the reactant at such rate as to maintain turbulence of contact mass flow between reactant inlet and outlet, effecting a temporary separation of reactant from contact mass at one or more levels between said reactant inlet and outlet, and maintaining a substantially compact contact mass column above said outlet and below said inlet.

3. That method for the conversion of hydrocarbons in the presence of a particle form solid contact mass material which comprises flowing the contact mass downwardly under the influence of gravity through a confined passage, introducing contact mass to the top of said passage and removing it from the bottom thereof at a rate such as to maintain the passage substantially filled with a column of contact mass, introducing fluid reactant at conversion conditions of temperature and pressure to said column at a point adjacent but spaced above the bottom thereof, removing reactant from said column at a point near but spaced below the column top, preventing substantial flow of reactant into the portion of the contact mass column above reactant outlet level, flowing the reactant at such rate as to maintain turbulence of contact mass flow between reactant inlet and outlet, and maintaining a substantially compact contact mass column above said outlet and below said inlet.

4. That method for the conversion of hydrocarbons in the presence of a particle form solid contact mass material which comprises flowing the contact mass downwardly under the influence of gravity through a confined passage, introducing contact mass to the top of said passage and removing it from the bottom thereof at a rate such as to maintain the passage substantially filled with a column of contact mass, introducing fluid reactant at conversion conditions of temperature and pressure to said column at a point adjacent but spaced above the bottom thereof, removing reactant from said column at a point near but spaced below the column top, preventing substantial flow of reactant into the portion of the contact mass column above reactant outlet level, flowing the reactant at such rate as to maintain turbulence of contact mass flow between reactant inlet and outlet, effecting a temporary separation of reactant from contact mass at one or more levels between said reactant inlet and outlet, and maintaining a substantially compact contact mass column above said outlet and below said inlet.

5. In an apparatus for treatment of fluid reactants in the presence of a particle form solid contact mass material a passage defining an enclosed, vertically columnar reaction space, means to feed contact mass material into the top thereof and means to remove it from the bottom thereof while maintaining the column substantially filled with contact mass, reactant inlet means near the bottom of said column but spaced away therefrom, reactant withdrawal means near the top of said contact mass column but spaced below said top, and between said reactant inlet and outlet at least one breaker assembly comprising open topped troughs surmounted by inverted angle-shaped troughs having slotted sides, said open topped troughs being constructed and arranged to separate reactant from contact mass and said angle-shaped troughs being constructed and arranged to commingle reactant with a different portion of said contact mass material.

6. In an apparatus for treatment of fluid reactants in the presence of a particle form solid contact mass material, a substantially vertical vessel closed on either end, means to introduce contact mass material into the top thereof and means to remove it from the bottom thereof while maintaining said vessel substantially filled with said contact mass material, reactant inlet means near but above the bottom of said vessel, reactant outlet means near but below the top of said vessel, and between the reactant inlet and outlet level members defining a plurality of short vertical open topped substantially contact-mass free passages for reactant surmounted by members adapted to commingle reactant with another portion of said contact mass material.

LOUIS P. EVANS.